US012361203B2

(12) United States Patent
Zhang et al.

(10) Patent No.: US 12,361,203 B2
(45) Date of Patent: Jul. 15, 2025

(54) ARCHITECTURES FOR MODELING COMMENT AND EDIT RELATIONS

(71) Applicant: Microsoft Technology Licensing, LLC, Redmond, WA (US)

(72) Inventors: Xuchao Zhang, Redmond, WA (US); Sujay Kumar Jauhar, Redmond, WA (US); Michael Gamon, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 16/388,287

(22) Filed: Apr. 18, 2019

(65) Prior Publication Data

US 2020/0334326 A1    Oct. 22, 2020

(51) Int. Cl.
*G06F 40/169*     (2020.01)
*G06F 40/197*     (2020.01)
(Continued)

(52) U.S. Cl.
CPC .......... *G06F 40/169* (2020.01); *G06F 40/197* (2020.01); *G06F 40/20* (2020.01); *G06N 3/08* (2013.01); *G06N 20/00* (2019.01)

(58) Field of Classification Search
CPC .... G06F 16/93; G06F 16/219; G06F 16/1973; G06F 16/2358; G06F 16/2457;
(Continued)

(56) References Cited

U.S. PATENT DOCUMENTS 8,381,095 B1    2/2013  Fischer
8,533,593 B2    9/2013  Grossman et al.
(Continued)

FOREIGN PATENT DOCUMENTS

CN    106575287 A    4/2017
CN    106663089 A    5/2017
CN    109213870 A    1/2019

OTHER PUBLICATIONS

Aji, et al., "Using the Past to Score the Present: Extending Term Weighting Models Through Revision History Analysis", In Proceedings of the 19th ACM International Conference on Information and Knowledge Management, Oct. 26, 2010, pp. 629-638.
(Continued)

*Primary Examiner* — Maikhanh Nguyen
(74) *Attorney, Agent, or Firm* — Schwegman Lundberg & Woessner, P.A.

(57) ABSTRACT

Generally discussed herein are devices, systems, and methods for determining a relationship between an edit and a comment. A system can include a memory to store parameters defining a machine learning (ML) model, the ML model to determine a relationship between an edit, by an author or reviewer, of content of a document and a comment, by a same or different author or reviewer, regarding the content of the document, and processing circuitry to provide the comment and the edit as input to the ML model, and receive, from the ML model, data indicating a relationship between the comment and the edit, the relationship including whether the edit addresses the comment or a location of the content that is a target of the comment.

16 Claims, 9 Drawing Sheets

(51) Int. Cl.
    *G06F 40/20*     (2020.01)
    *G06N 3/08*     (2023.01)
    *G06N 20/00*     (2019.01)

(58) Field of Classification Search
    CPC ...... G06F 40/30; G06F 40/166; G06F 40/169; G06F 40/197; G06F 11/3438; G06K 9/72; G06K 9/00442; G06K 9/00469; G06N 3/08; G06N 3/0454; G06N 3/0472; G06N 20/00; G06N 7/005; H04L 51/16; H04L 67/22
    USPC .......................................................... 715/229
    See application file for complete search history.

(56) References Cited

U.S. PATENT DOCUMENTS

| | | | |
|---|---|---|---|
| 9,418,054 | B2 | 8/2016 | Shaver |
| 9,705,996 | B2* | 7/2017 | Oh ......................... H04L 51/04 |
| 10,244,286 | B1* | 3/2019 | Jia ...................... H04N 21/6582 |
| 2015/0142676 | A1* | 5/2015 | McGinnis ............ G06Q 10/103 705/301 |
| 2015/0286624 | A1 | 10/2015 | Simons et al. |
| 2017/0024374 | A1* | 1/2017 | Bastide ............... G06F 16/3329 |
| 2017/0034107 | A1* | 2/2017 | Krishnaswamy ......... G06F 7/08 |
| 2017/0255604 | A1 | 9/2017 | Wilde et al. |
| 2018/0041458 | A1* | 2/2018 | Hawkins ................ G06Q 50/01 |
| 2018/0260416 | A1* | 9/2018 | Elkaim .................... G06N 3/04 |
| 2018/0261214 | A1* | 9/2018 | Gehring .................. G06F 40/47 |
| 2020/0133662 | A1* | 4/2020 | Smith ................... G06N 3/0445 |
| 2020/0293616 | A1* | 9/2020 | Nelson .................. G06F 16/345 |

OTHER PUBLICATIONS

Androutsopoulos, et al., "A Survey of Paraphrasing and Textual Entailment Methods", In Journal of Artificial Intelligence Research, vol. 38, Issue 1, May 28, 2010, pp. 135-187.

Bronner, et al., "User Edits Classification Using Document Revision Histories", In Proceedings of the 13th Conference of the European Chapter of the Association for Computational Linguistics, Apr. 23, 2012, pp. 356-366.

Burges, Christopher J.C., "From Ranknet to Lambdarank to Lambdamart: An Overview", In Microsoft Research Technical Report MSR-TR-2010-82, Jun. 23, 2010, pp. 1-19.

Burges, et al., "Learning to Rank Using Gradient Descent", In Proceedings of the 22nd International Conference on Machine Learning, Aug. 7, 2005, 8 Pages.

Burges, et al., "Learning to Rank with Nonsmooth Cost Functions", In Proceedings of Advances in Neural Information Processing Systems, Dec. 4, 2006, 8 Pages.

Chung, et al., "Empirical Evaluation of Gated Recurrent Neural Networks on Sequence Modeling", In repository of arXiv, arXiv:1412.3555, Dec. 11, 2014, pp. 1-9.

Conneau, et al., "Supervised Learning of Universal Sentence Representations from Natural Language Inference Data", In Proceedings of the Conference on Empirical Methods in Natural Language Processing, Sep. 7, 2017, pp. 670-680.

Crammer, et al., "Online Passive-aggressive Algorithms", In Journal of Machine Learning Research, vol. 7, Mar. 2006, pp. 551-585.

Ganter, et al., "Finding Hedges by Chasing Weasels: Hedge Detection Using Wikipedia Tags and Shallow Linguistic Features", In Proceedings of the ACL-IJCNLP 2009 Conference Short Papers, Aug. 4, 2009, pp. 173-176.

Liaw, et al., "Classification and Regression by Randomforest", In Journal of R News, vol. 2, Issue 3, Dec. 2002, pp. 18-22.

Max, et al., "Mining Naturally-occurring Corrections and Paraphrases from Wikipedia's Revision History", In Proceedings of the Seventh International Conference on Language Resources and Evaluation, May 2010, pp. 3143-3148.

Nalisnick, et al., "Improving Document Ranking with Dual Word Embeddings", In Proceedings of the 25th International Conference Companion on World Wide Web, Apr. 11, 2016, pp. 83-84.

Nunes, et al., "Term Weighting Based on Document Revision History", In Journal of the American Society for Information Science and Technology, vol. 62, Issue 12, Dec. 2011, 26 Pages.

Nunes, et al., "Wikichanges: Exposing Wikipedia Revision Activity", In Proceedings of the 4th International Symposium on Wikis, Article No. 25, Sep. 8, 2008, 4 Pages.

Pennington, et al., "Glove: Global Vectors for Word Representation", In Proceedings of the Conference on Empirical Methods in Natural Language Processing, Oct. 25, 2014, pp. 1532-1543.

Ratsch, et al., "Soft Margins for AdaBoost", In Journal of Machine Learning vol. 42, Issue 3, Mar. 1, 2001, pp. 287-320.

Seo, et al., "Bidirectional Attention Flow for Machine Comprehension", In repository of arXiv, arXiv:1611.01603, Nov. 5, 2016, pp. 1-12.

Yamangil, et al., "Mining Wikipedia Revision Histories for Improving Sentence Compression", In Proceedings of the 46th Annual Meeting of the Association for Computational Linguistics on Human Language Technologies: Short Papers, Jun. 16, 2008, pp. 137-140.

Yang, et al., "Identifying Semantic Edit Intentions from Revisions in Wikipedia", In Proceedings of the Conference on Empirical Methods in Natural Language Processing, Sep. 7, 2017, pp. 2000-2010.

Yatskar, et al., "For the Sake of Simplicity: Unsupervised Extraction of Lexical Simplifications from Wikipedia", In Proceedings of the Human Language Technologies: The Annual Conference of the North American Chapter of the Association for Computational Linguistics, Jun. 2, 2010, pp. 365-368.

Yu, et al., "Qanet: Combining Local Convolution with Global Self-Attention for Reading Comprehension", In Proceedings of Sixth International Conference on Learning Representations, Apr. 30, 2018, 16 Pages.

Zanzotto, et al., "Expanding Textual Entailment Corpora from Wikipedia Using Co-Training", In Proceedings of the 2nd Workshop on The People's Web Meets NLP: Collaboratively Constructed Semantic Resources, August , 2010, pp. 28-36.

Zesch, Torsten, "Measuring Contextual Fitness Using Error Contexts Extracted from the Wikipedia Revision History", In Proceedings of the 13th Conference of the European Chapter of the Association for Computational Linguistics, Apr. 23, 2012, pp. 529-538.

Zhu, et al., "Semantic Document Distance Measures and Unsupervised Document Revision Detection", In Proceedings of the The 8th International Joint Conference on Natural Language Processing, Nov. 27, 2017, pp. 947-956.

Agrawal, et al., "Predicting the Quality of user Contributions via LSTMs", In Proceedings of the 12th International Symposium on Open Collaboration, Aug. 17, 2016, 10 Pages.

Dang, et al., "An End-To-End Learning Solution for Assessing the Quality of Wikipedia Articles", In Proceedings of the 13th International Symposium on Open Collaboration, Aug. 23, 2017, 11 Pages.

"International Search Report and Written Opinion Issued in PCT Application No. PCT/US2020/023468", Mailed Date: May 14, 2020, 13 Pages.

"Office Action Issued in Indian Patent Application No. 202117044998", Mailed Date: Aug. 3, 2023, 8 Pages.

Office Action Received for Chinese Application No. 202080028307.6, mailed on Oct. 17, 2023, 8 pages (English Translation Provided).

* cited by examiner

ARCHITECTURES FOR MODELING COMMENT AND EDIT RELATIONS

BACKGROUND

Management of collaborative documents may be difficult, given the profusion of edits and comments that one or more authors make during a document's evolution. Reliably modeling the relationship between edits and comments may help the user keep track of a document in flux. Thus, subject matter herein regards exploring the relationship between comments and edits.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

A system may be configured to implement a machine learning (ML) technique. The ML technique can identify a relationship between an edit and a comment of a same or different document. The system may include a memory to store parameters defining an ML model to determine the relationship between an edit, by an author or reviewer, of content of a document and a comment, by a same or different author or reviewer, regarding the content of the document. The system may include processing circuitry to provide the comment and the edit as input to the ML model, and receive, from the MIL model, data indicating a relationship between the comment and the edit, the relationship including whether the edit addresses the comment or a location of the content that is a target of the comment.

The relationship between the comment and the edit may indicate at least one of (a) the comment most-related to the edit or (b) a location of the document that is most likely to be the target of the edit, given the comment. The ML model may be configured to determine a relevance score between the edit and the comment and indicate the relationship between the comment and the edit based on the relevance score.

The processing circuitry can further determine, based on a pre-edit version of the document and a post-edit version of the document, an action encoding indicating whether the content is the same, removed, or added between content of the pre-edit version and post-edit version of the document by associating content only in the pre-edit version with a first label, associating content only in the post-edit version with a second, different label, and associate content in both the pre-edit version and the post-edit version with a third, different label, and provide the action encoding with the comment and the edit to the ML model. The ML model can determine the relationship between the comment and the edit further based on the action encoding.

The ML model may include a hierarchical neural network (NN) trained using a supervised learning technique. The ML model may include an input embed layer that projects words in the edit and the comment to one or more respective vector spaces, a context embed layer to model sequential interaction between content based on the projected edit and comment, a comment-edit attention layer to model a relationship between the edit and the comment based on the modeled sequential interaction, and an output layer to determine the relationship between the edit and the comment based on the modeled relationship. The context embed layer may determine a similarity matrix based on the edit and the comment, wherein the similarity matrix that indicates how similar content of the edit is to content of the comment. The comment-edit attention layer may determine a normalized probability distribution of the similarity matrix combined with the action encoding. The processing circuitry may farther provide a signal to an application that generated the document, the signal indicating a modification to the document.

A method of determining a relationship between a document revision and a revision comment of an edited document may include labelling unchanged content between a pre-edit version of the edited document and a post-edit version of the edited document with a first label, labelling content in the pre-edit version of the edited document that is different from the content in the post-edit version of the edited document with a second, different label, labelling the document revision in the post-edit version of the edited document with a third, different label, the document revision corresponding to content in the post-edit version of the edited document that is different from the content in the pre-edit version of the edited document, and determining, based on the content in the pre-edit version of the edited document, the content in the post-edit version of the edited document, the revision comment, and the first, second, and third labels, and using a machine learning (ML) model, the relationship between the revision comment and the document revision.

The method may farther include, wherein the ML model is trained based on at least one of a comment ranking loss function and an edit anchoring loss function. The method may further include, wherein the ML model is trained based on both the comment ranking loss function and the edit anchoring loss function. The method may further include, wherein the ML model is a hierarchical neural network (NN) trained using a supervised learning technique.

The method may further include, wherein the ML model includes an input embed layer that projects the document revision and the revision comment to a vector space, a context embed layer to model sequential interaction between content based on the projected edit and comment, a comment-edit attention layer to model a relationship between the projected and embedded edit and the projected and embedded comment based on the modeled sequential interaction, and an output layer to determine the relationship between the document revision and the comment based on the modeled relationship. The method may further include, wherein the context embed layer determines a similarity matrix based on the document revision and the revision comment, wherein the similarity matrix that indicates how similar content of the document revision is to content of the revision comment.

A machine-readable medium (MRM) may include instructions that, when executed by a machine, configure the machine to perform operations comprising receiving pre-edit content of a document, post-edit content of the document, and a comment associated with the document, operating a machine learning (ML) model on the pre-edit content, post-edit content, and the comment to determine a relevance score indicating the relationship between content in the post-edit content that is not in the pre-edit content and the comment, and providing data indicating the relationship between the content in the post-edit content that is not in the pre-edit content and the comment. The MRM may further include, wherein the operations further comprise labelling unchanged content between the pre-edit version of the document and the post-edit version of the document with a first label, labelling content in the pre-edit version of the document that is different from the content in the post-edit version of the document with a second, different label, labelling content in the post-edit version of the document that is different from the content in the pre-edit version of the document with a third, different label, and wherein operating the ML model includes further operating the ML model on the first, second, and third labels to determine the relationship between content in the post-edit content that is not in the pre-edit content and the comment of the document.

The MRM may further include, wherein the ML model is trained based on at least one of a comment ranking loss function and an edit anchoring loss function. The MRM may further include, wherein the ML model is trained based on both the comment ranking loss function and the edit anchoring loss function. The MRM may further include, wherein the ML model is a hierarchical neural network (NN) trained using a supervised learning technique

DETAILED DESCRIPTION

Figure 1A:
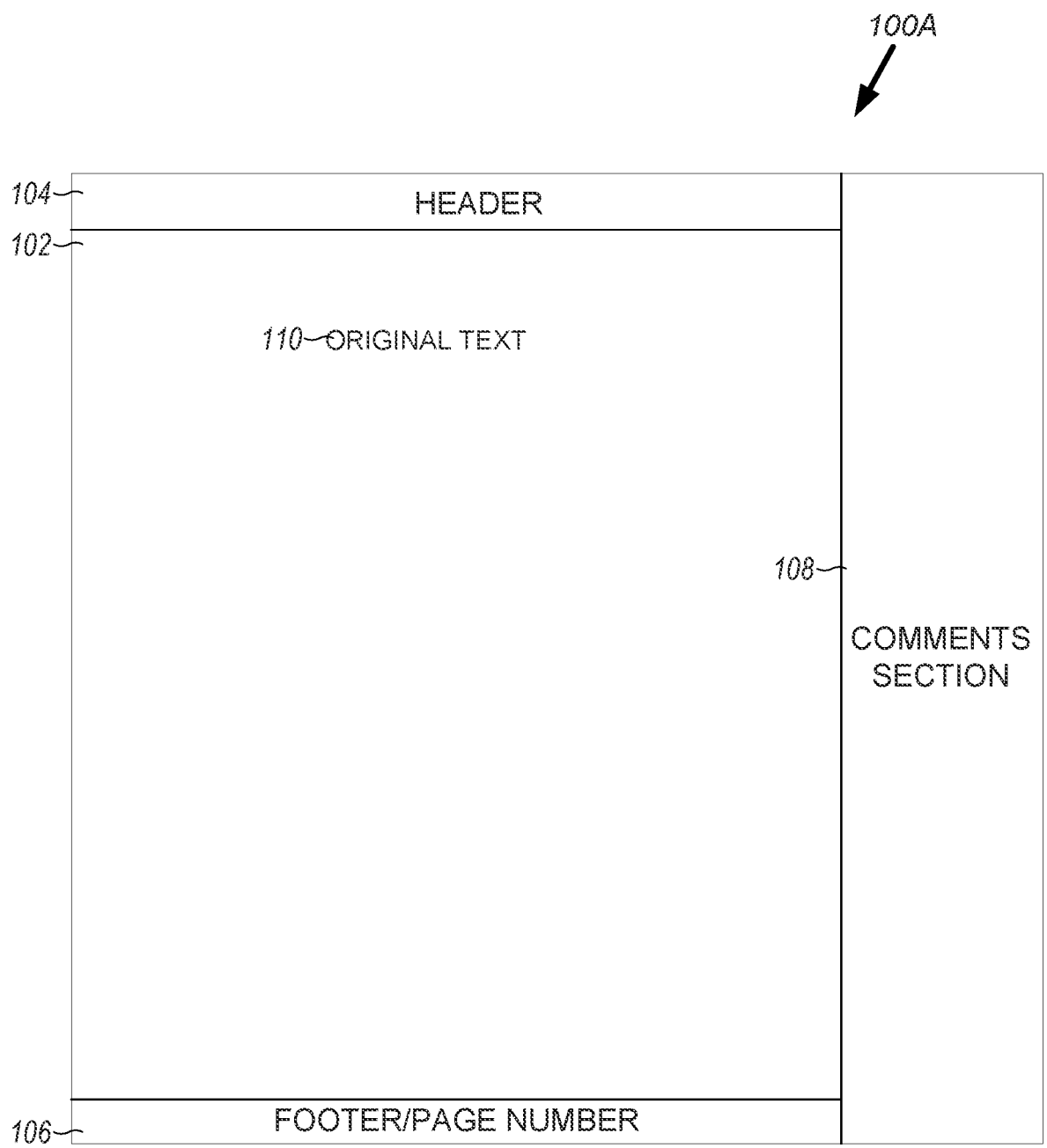
FIGS. 1A, 1B, 1C illustrate, by way of example, respective diagrams of an embodiment of a document in various stages of an editing process.

In the following description, reference is made to the accompanying drawings that form a part hereof and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

Artificial intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Embodiments described herein may advantageously improve the operation of word processing, video processing, audio processing, image processing, or other content processing applications. In processing the content, one or more users may edit the content, such as by adding content, removing content, providing commentary on the content, or otherwise making a document revision. The commentary on the content is included in a comment. The comment is a note or annotation that an author or reviewer may add to a document. The comment is generally not part of the content (the part that the author intends to be consumed after publication) but is instead a different portion of a document.

Embodiments provide an ability to automatically associate, or automatically update an association, of a comment to the content of a document or vice versa. The association may be determined automatically (e.g., without human interference after deployment). The association may be presented to a user to help them manage winch comments have been addressed. The association may be used to determine (e.g., automatically) whether a comment has been resolved. A comment that is determined to be resolved may be indicated as resolved in the application.

The concept of an "attention" in the context of this disclosure identifies which changes in an edit (document revision) are most likely to correspond to one or more words of a comment (e.g., a comment regarding a revision, sometimes called a revision comment), such as the entire comment. By factoring attention into a NN (focusing on comments and edit content), the NN that determines a comment-to-edit relationship may be improved. Other improvements and advantages are discussed with reference to the FIGS.

Comments are widely used in collaborative document writing as a natural way to suggest and track changes, annotate content and explain the intent of edits. Comments are commonly used as reminders for a user to perform a task. A user may be drafting a document and add a comment indicating to make a specific edit in the future. For example, consider a user drafting a paper with a Summary, Body, and Conclusion section. The user may add a comment to the Summary indicating that section is to be completed after the Body and Conclusion are complete. In another example, the user or another user may add a comment to the Body indicating to clarify what is meant by a word or phrase, that a typo needs to be fixed, that a sentence is confusing, that more explanation is needed, or the like.

In the edit process, the user may eventually act on the comment by making an alteration indicated by the comment. The user, in performing the alteration, may or may not indicate the comment as resolved. It is not always trivial to associate a comment with a corresponding edit or determine that a comment is resolved based on an edit to the document. Embodiments herein provide methods, devices, systems, and machine-readable media for associating one or more edits with a comment, such as to indicate whether a comment is resolved.

The editing process may change the order of paragraphs, sentences, words, or the like. Such editing may strand comments in confusing and contextually inappropriate locations. Associating a comment with an edit provides a location in the document associated with the comment. Both of the issues (comment resolution and comment location determination) may be exacerbated when multiple authors are simultaneously working on the document.

Modeling the relationship between user comments and edits may facilitate the maintenance of comments in document revisions. Modeling this relationship allows for a number of downstream uses, such as detecting completed to-do items, re-arranging comment positions, and summarizing or categorizing edits.

Embodiments provide a joint modeling framework for edits and comments that operates to optimize an ability of the ML model to perform multiple tasks. The joint model framework may be evaluated based on associating a comment to an edit (sometimes called comment ranking), and an edit to a comment (sometimes called edit anchoring). The former is the task of identifying (e.g., based on a ranking) a most relevant comment. The latter task identifies one or more locations in a document that are most likely to undergo change as the result of a specific comment.

A training set may be identified or generated. The training set may include documents that include one or more comments and one or more associated edits. The association between the comments and the edits in the training data may be known (e.g., manually labeled), so as to provide the ability to train an ML model in a supervised manner.

The ML model may include an NN, a Bayesian technique, a K means clustering technique, a Support Vector Machine (SVM) technique, a linear regression technique, a decision tree, a random forest technique, a logistic regression technique, an nearest neighbor technique, among others. The following discussion regards NNs that provide an ability to associate a comment with one or more edits, an edit with one or more comments, or a comment to one or more portions of a document. The NNs may include deep learning NNs. The NNs may be hierarchical.

Embodiments are capable of performing accurate comment ranking, edit anchoring, or a combination thereof. A single model may be trained for both comment ranking and edit anchoring, or for just one of those tasks. For training both tasks, many of the same NN components may be used (re-used), since the fundamental task is the same—that of modelling a comment-edit relationship.

Embodiments may use a representation of edits that accounts for content of a document before and after edit. This may help with comment-edit association, as a comment may apply to noncontiguous sequences of content, which pose a challenge for sequence modeling approaches. Embodiments may consider contextual information (unchanged content immediately before or after an edit). To differentiate the context from edited content, an edit operation may be encoded as an addition (e.g., added one or more characters, added formatting, added external object (e.g., image, graph, table, or the like)) or deletion (e.g., removed one or more characters, formatting, object, or the like).

A summary of performance benefits of some embodiments is provided after a description of the embodiments. Reference will now be made to the FIGS. to describe further details of embodiments.

Figure 1B:
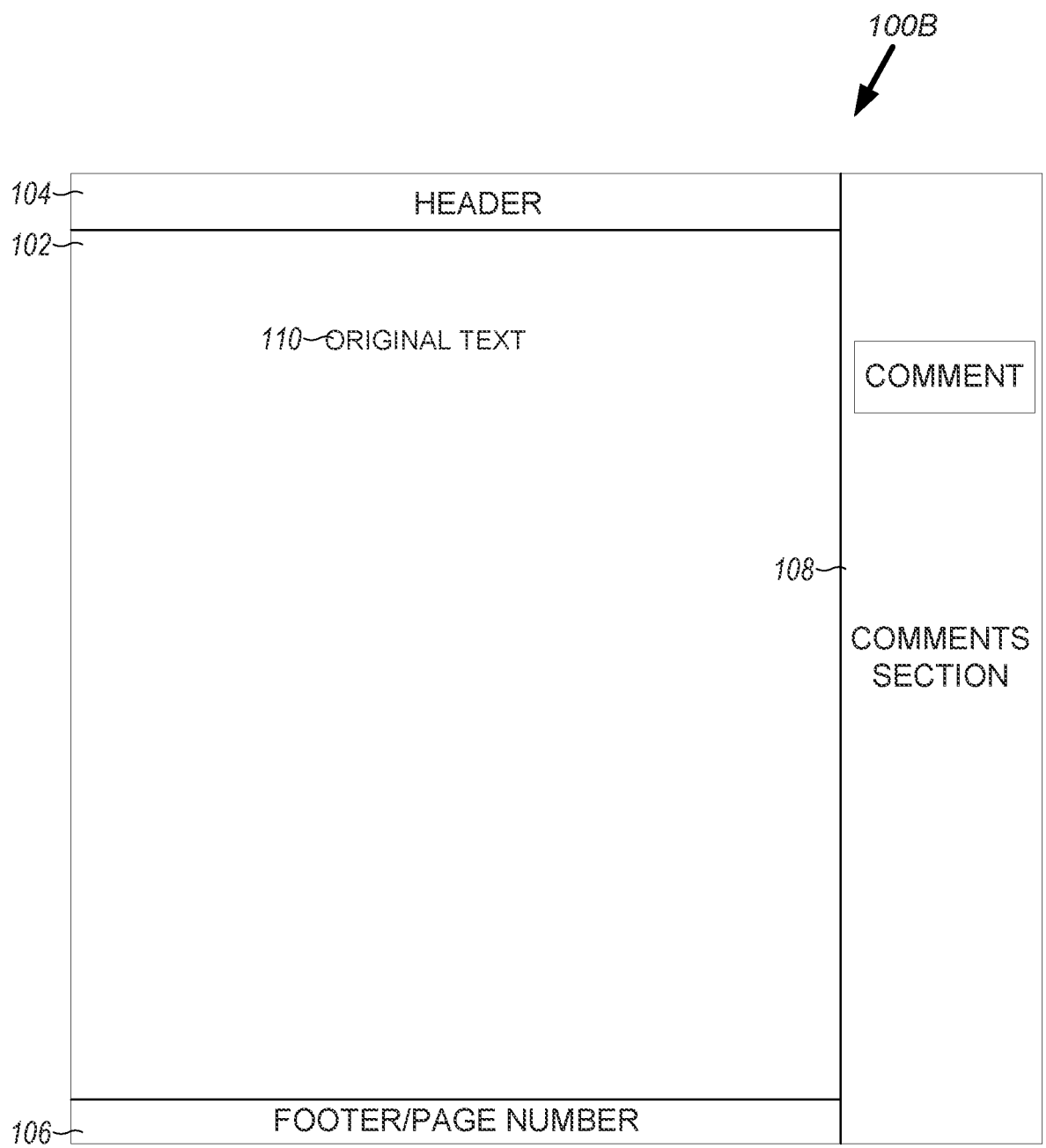
Figure 1C:
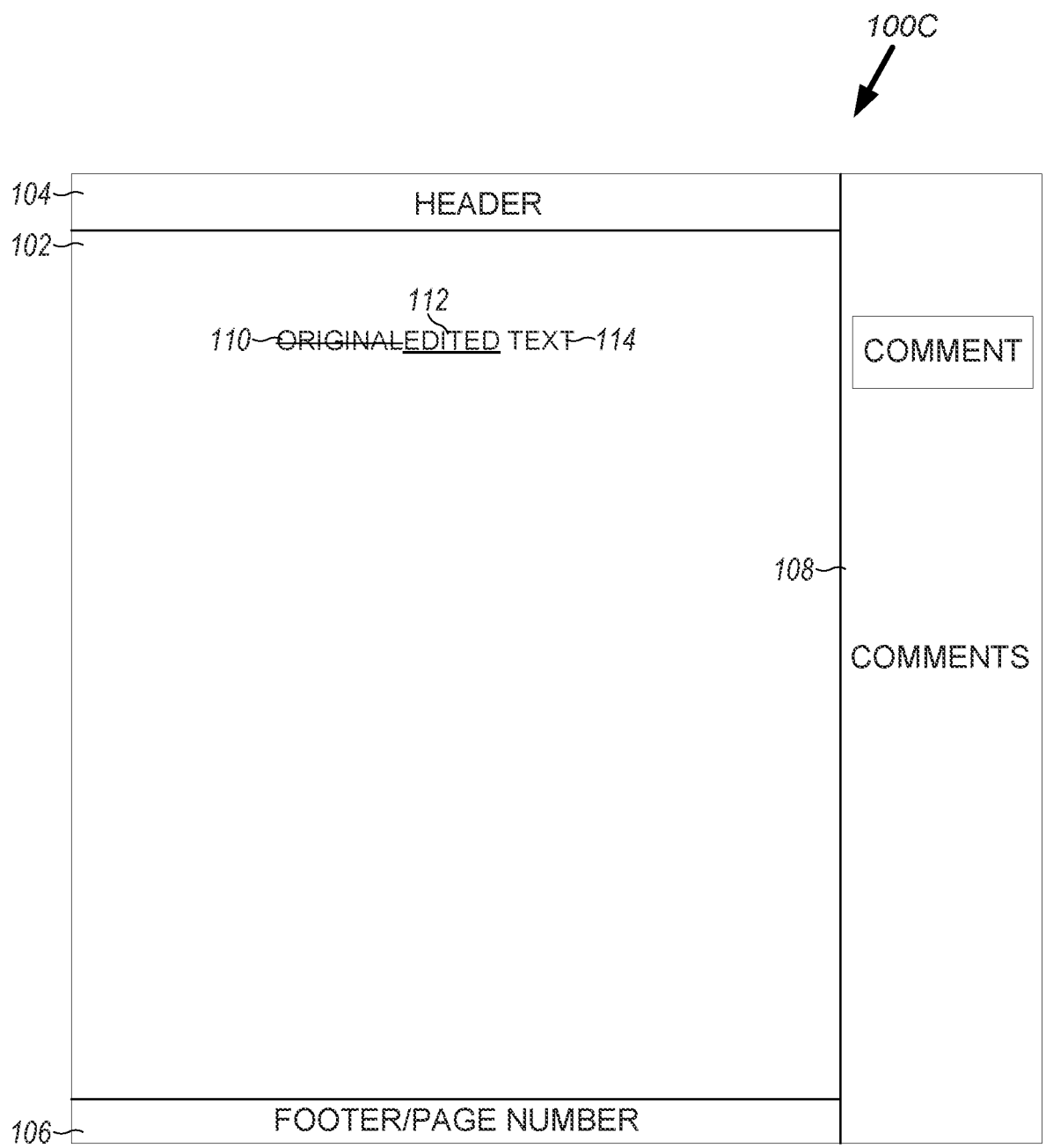

FIG. 1A illustrates, by way of example, a diagram of an embodiment of a pre-edit version of a document 100A. FIG. 1B illustrates, by way of example, a diagram of an embodiment of the pre-edit version of the document from FIG. 1A after a comment has been added resulting in a document 100B with a comment. FIG. 1C illustrates, by way of example, a diagram of an embodiment of a post-edit version of a document 100C. The document 100A-C may be produced using any of a variety of applications. Applications for producing a document include any of the applications provided in Office (e.g., Word, PowerPoint®, Excel®, OneNote®, Access®, Outlook®, or the like) from Microsoft® Corporation of Redmond, WA, United States, among many others. The application can be a standalone application, provided through an integrated development environment (IDE), web platform, or web browser (e.g., through Office 365®), or the like. Note that while embodiments regard edits and comments to documents, embodiments may apply to any documents with revision history. Embodiment may apply to edits in projects, such as video, audio, images, source code (e.g., using Microsoft® Visual Studio®, or other editing application or platform), or a combination thereof. In some embodiments, the document 100A-C may detail web content. The web content is the textual, visual, or aural content that is encountered as part of user experience on a website. Hypertext Markup Language (HTML) is the predominant format for web content.

The document 100A-C as illustrated includes a body portion 102, a header portion 104, a footer portion 106, and a comments section 108. The body portion 102 generally includes a bulk of the content of the document 100A-C.

The body portion 102 may include text or other character representations, a graph, table, image, an animation (e.g., a Graphics Image Format (GIF) image, animated portable network graphics (APNG) graphic, WebP image, Multiple-Image Network Graphics (MING) graphic, Free Lossless Image Format (FLIF) image, or the like). The header portion 104, the footer portion 106, and the comments section 108 generally provide context to the content of the body portion 102. For example, a page number may be provided in the footer portion 106. In another example, an item to be completed may be indicated in the comments section 108. In yet another example, a confidentiality or proprietary information notice, title, section number, date last edited, author, or the like may be provided in the header portion 104.

Figure 2:
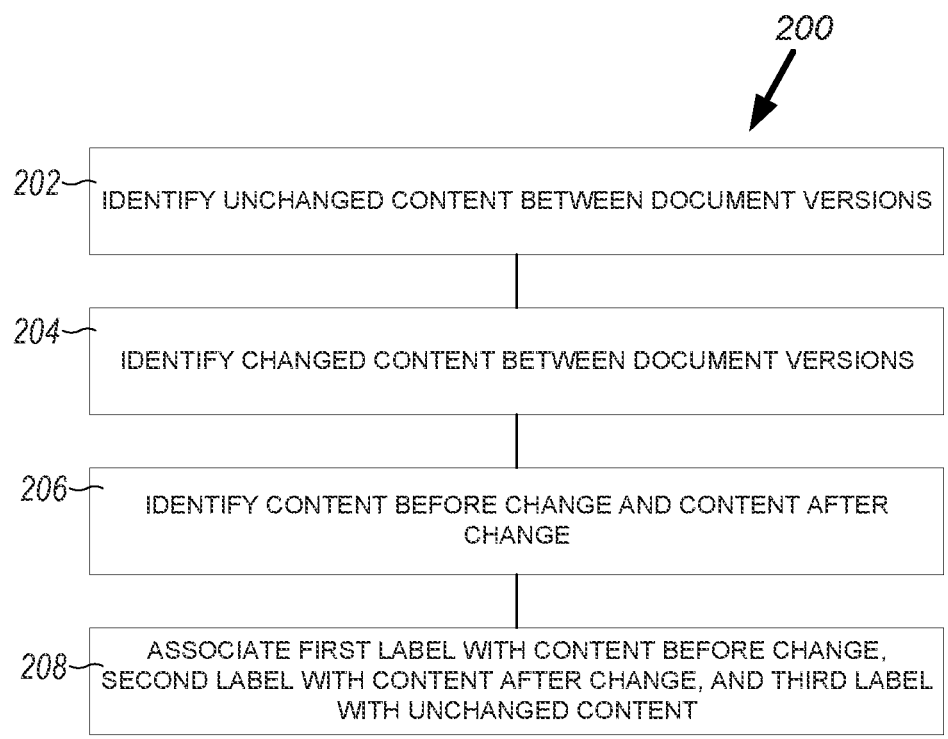
FIG. 2 illustrates, by way of example, a diagram of an embodiment of a method for labelling changes in a document.

The body portion 102 as illustrated includes modified content 110, content after edit 112, and unchanged content 114. Note that in some extreme cases, all of the content of the body portion 102 may be modified or unmodified. Modifications to the content of the body portion 102 may not always be evident in the document 100C. In such examples, a document pre-modification (the document 100A) may be compared to the document post-modification (the document 100C). The comparison may identify changes to the document 100A. In some applications, one may track modifications by selecting a control object, such as Track Changes (when using Word) or a similar control object. Regardless of whether the modifications are identified by comparison or indicated by modification tracking, the modifications may be labelled. FIG. 2 illustrates an example method 200 for labelling changes in a document.

The document 100A-C is merely one example of a document format. For example: in some documents, the comments section 108 may not be provided and may instead be provided in a different document; some documents do not provide ability for a header portion 104 or a footer portion 106; some documents provide comments on a layer over the body portion 102, such as through a sort of sticky note; some documents allow for page numbers, but no text in the footer portion 106, or the like; some documents include one or more video files and audio files combined into a project and comments are provided by email, or the like; among many other document formats.

In some embodiments, a comment in the comments section 108 may be delineated by a specified string of characters. For example, a specific string of characters may indicate a beginning of a comment. In some examples, a same or different string of characters may indicate an end of a comment. Consider the programming language C. A beginning of a comment is indicated by "/*" and an end of the comment is indicated by "*/". These character strings can be identified and the text therebetween can be identified as a comment. Many other similar examples exist and are applicable to embodiments herein.

In summary, FIGS. 1A-1C show a pre-edit version of a document 100A, a post-edit version of a document 100C, and an intermediate version of a document 100B that includes a comment. The text 110 is an example of pre-edit content of the pre-edit version of the document 100A. In FIG. 1B the document 100A of FIG. 1A has a comment ("COMMENT") to produce the document 100B. The comment is provided on the pre-edit version 100A of the document by a user. For sake of explanation, assume the comment says "I recommend changing 'original text' to 'edited text'". In FIG. 1C, "original text" has been changed to "edited text" in the body portion 102. This document 100C in FIG. 1C is an example of a post-edit version of the document. The post-edit version of the document 100C, the comment, and the pre-edit version of the of the document 100A can be provided to a machine learning (ML) model. The ML model can determine a relationship between the comment and the edit, such as whether the edit addresses the comment, a location of content in the document that is a target of the comment, or the like.

FIG. 2 illustrates, by way of example, a diagram of an embodiment of a method 200 for labelling changes in a document. The method 200 as illustrated includes identifying unchanged characters between document versions, at operation 202; identifying changed characters bet-ween document versions, at operation 204; identifying characters before change and after change, at operation 206; and associating a first label with content before change, second label with content after change, and a third label with unchanged content, at operation 208. Different labels may be used for each of the first, second, and third labels. The labels may include a character, such as a number. For example, the first label may be a smaller number than the third label, which may be a smaller number than the second label. Consider the content in the body portion 102 of the document 100C of FIG. 1C. Using the method 200, "ORIGINAL" may be associated with a first label of "−1", "TEXT" may be associated with a third label of "0", and "EDITED" may be associated with a second label of "1". The method 200 may be performed for all content of the body portion 102, header portion 104, footer portion 106, or comments section 108. Other labels are possible and other relative value of labels are also possible.

Figure 3:
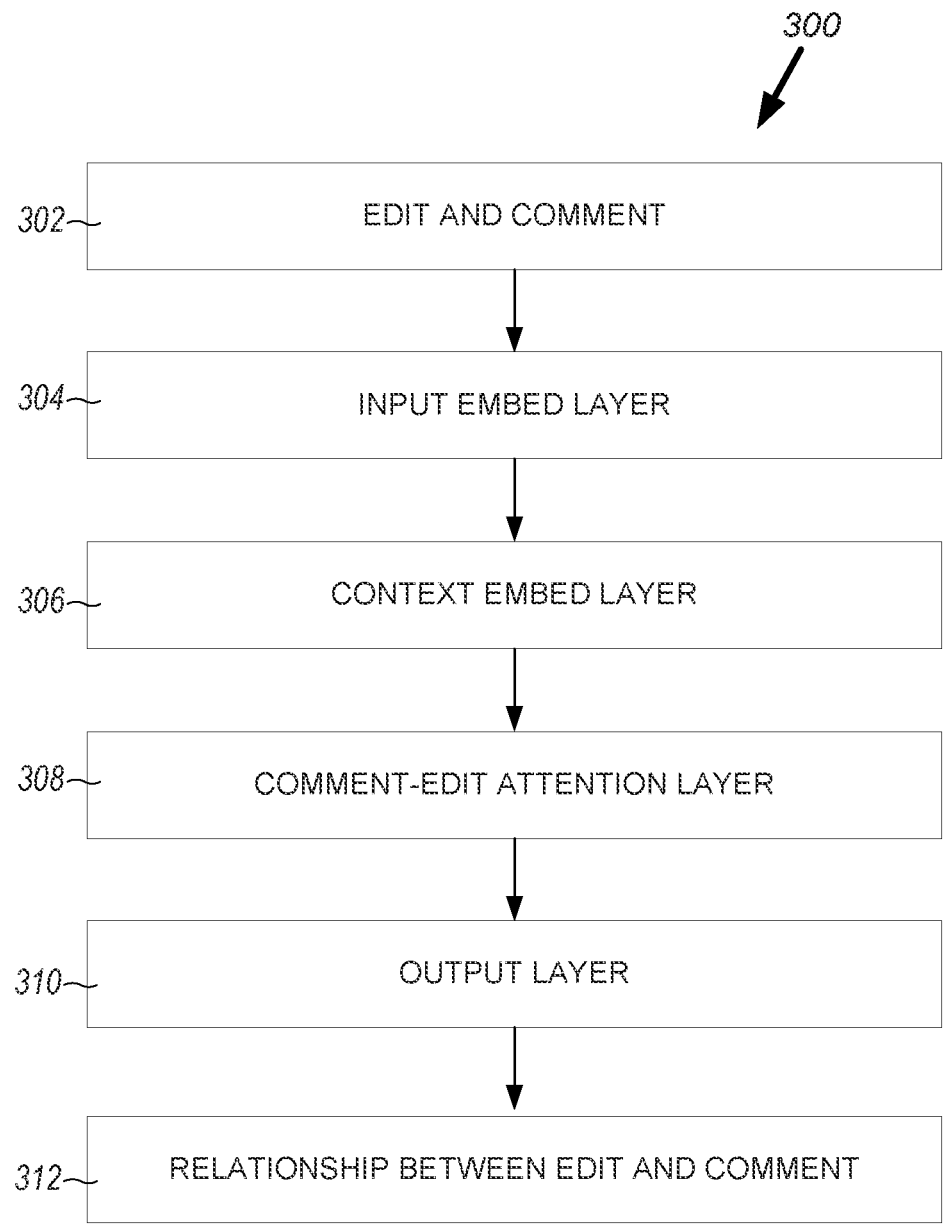
FIG. 3 illustrates, by way of example, a diagram of an embodiment of a method for associating a comment with an edit (or vice versa).

FIG. 3 illustrates, by way of example, a diagram of an embodiment of a method 300 for associating a comment with an edit (or vice versa). The method 200 can be used in conjunction with, in addition to, or without the method 300. At operation 302, one or more edits and one or more comments may be provided. The edits and comments may be identified by analyzing metadata (e.g., in an example in which alteration tracking is being performed), analyzing multiple versions of the same document, analyzing a comments document (e.g., an email, another document produced by a same application, or the like), or a combination thereof. The edits may be indicated by pre-edit content and post-edit content.

At operation 304, portions of the edits and comments (e.g., words or some other subset of the edits or comments) may be provided as input to an input embed layer of the NN. The input embed layer may project the portions of the comments and edits to a high-dimensional vector space. In the high-dimensional vector space, the portions of the edits and comments with the same or similar semantic meanings are closer to each other than those with less similar meanings. Example techniques for projecting the comments to a pre-trained high-dimensional vector space include Word2Vec, embeddings from language models (ELMO), bidirectional encoder representations from transformers (BERT), and global vectors (GloVe) for word representation. In some embodiments, the embeddings from the high-dimensional vector space can be used to initialize an embedding layer NN which then is then trained, to be adapted to an edit-comment relationship determination task.

The output of the operation may include an embedding representation, U, of the pre-edit content, an embedding representation, V, of the of the post-edit document, and an embedding representation, Q, of each comment.

At operation 306, the embedding representations, U, V, Q, are provided as input to the context embed layer of the NN. The context embed layer may include a gated recurrent unit (GRU), long short-term memory (LSTM) unit, convolutional neural network (CNN) with attention, an auto-encoder, a transformer (a pure attention model without CNN or RNN), a combination thereof or the like. The context embed layer may model a sequential interaction between entities of the content. An entity may be, for example, a word, character, phrase, or the like. The entity defines the granularity at which the input embed layer determines embedding representations. The sequential interaction may be represented by a contextual embedding representation $U^C$, $V^C$, $Q^C$, of U, V, Q, respectively.

The operation 306 may further include combining (a) the contextual embedding representation of the pre-edit content, $U^C$, and the contextual embedding representation the comment, $Q^C$, and (b) the contextual embedding representation of the post-edit content, $V^C$, and the contextual embedding representation of the comments, $Q^C$. The combination may include a product (multiplication), such as a Hadamard product, or other element-wise weighted product.

The operation 306 may further include appending an action encoding vector, a, to the respective results of the combination to generate action-encoded combinations. The action-encoded combinations may be respectively weighted, such as by a trainable weight vector, to generate a pre-edit similarity matrix, $S^{pre}$, and a post-edit similarity matrix, $S^{post}$.

At operation 308, the similarity matrices may be provided to a comment-edit attention layer. The comment-edit attention layer may determine comment-to-edit (C2E) attention vectors. The C2E vectors represent the relevance of words in the edit relative to the comment. The C2E vectors may be determined based on a column-wise maximum of the respective similarity matrices, $S^{pre}$, $S^{post}$. The C2E vectors may further be determined based on a normalized probability distribution (e.g., "softmax") of the column-wise maximum.

At operation 308, the respective C2E vectors may be combined with the respective similarity matrices, $S^{pre}$ and $S^{post}$, to generate respective relevance vectors, $h^{pre}$, $h^{post}$. The combination may include a multiplication of the C2E vector and the similarity matrices.

At operation 310, the relevance vectors $h^{pre}$, $h^{post}$, may be concatenated to generate a total relevance vector, h. During training, one or more loss functions may be applied to the relevance vector, h, at operation 310. More detail regarding the loss function is provided regarding FIG. 4.

At operation 312, a relationship between the comment and edit (or vice versa) may be provided. The relationship may indicate a relevance score between comments and edits. The relationship may indicate whether a sentence in the content is likely to be the location of an edit, given a comment.

The relationship between the edit and the comment may be used in a variety of applications. For example, an application may relocate a comment to the related edit. In another example, an application may indicate that a comment has been resolved or remove a comment that has an associated edit. In yet another example, a comment that is not related to an edit, but for which a specific edit and edit location is evident (e.g., comment of "typo", "misspelled", "delete X", "add" Y", or the like) the specific edit may be performed automatically (e.g., with track changes on or the like). For example, the relationship may be used to make modifications to the comment itself (e.g., resolving it, removing it, moving it) and/or make modifications to the text associated with the comment (e.g., editing the content automatically). Other applications may include automatically generating a comment for an edit, automatically generating comments that can then serve as a summary of the edits performed in the document, or the like.

Figure 4:
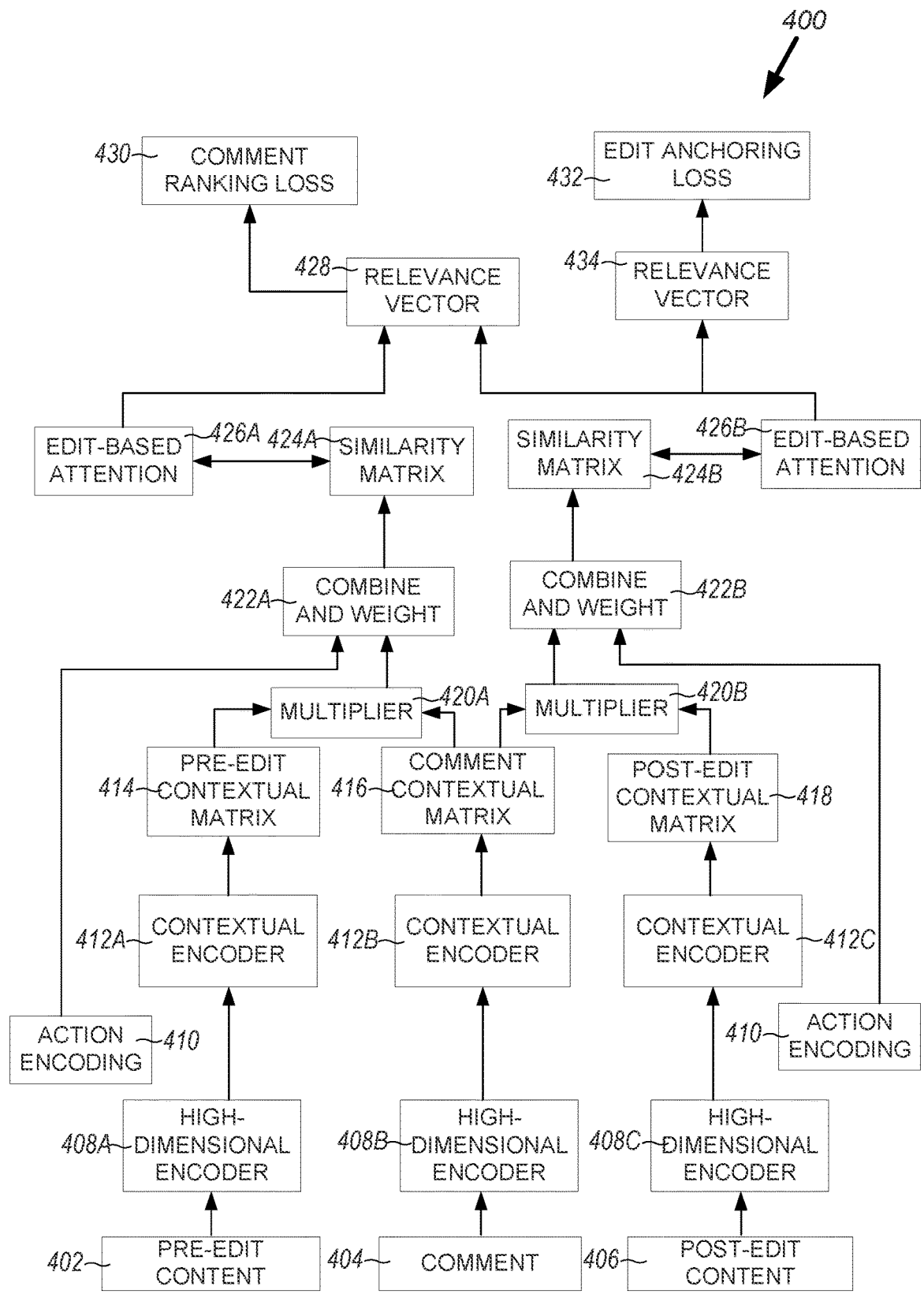
FIG. 4 illustrates, by way of example, a diagram of an embodiment of a system for determining a relationship between a comment and an edit or vice versa.

FIG. 4 illustrates, by way of example, a diagram of an embodiment of a system 400 for determining a relationship between a comment and an edit or vice versa. The comment-edit relationship determination operation is described with regard to comment ranking and edit anchoring. The system 400 is then explained in more detail. Consider that a comment, c, includes content $\{w_1, \ldots w_q\}$ (e.g., characters, words, sentences, paragraphs, or the like). Further consider pre-edit content, $e_s$, as the contiguous sequence of words spanning a first to a last edited content in a pre-edit document. The edit, $e_s$, may optionally contain some surrounding context, such as one or more characters around the edit. Formally this is defined as:

$$\{w_{i-k}, \ldots w_{i-1}, w_i, \ldots w_{i+p}, w_{i+p+1}, \ldots w_{i+p+k}\}$$

where $w_{i-k}, \ldots w_{i-1}$ is the content before edit, $w_i, \ldots w_{i+p}$ is the content edited, and $w_{i+p+1}, \ldots, w_{i+p+k}$ is the content after edit, i and i+p are the indices of the first and the last edited content in a revision, and k is the context window size. If there is more than one contiguous block of edited content, the contiguous blocks of edited content may be concatenated to form a set of edit words. Similarly, context words may also be concatenated. In some embodiments, content that appear in more than one context being restricted to a single appearance. A post-edit, $e_t$, may be similarly defined over a post-edit document.

Comment ranking is the task of finding one or more most relevant comments among a list of potential comment candidates, given one or more document edits. The inputs of the comment ranking task are some set of user comments $C=\{c_1, c_2, \ldots c_m\}$ pertaining to a document, and an edit $e=\{e_s, e_t\}$ pertaining to the same document, where $e_s$ is the pre-edit and $e_t$ is the post-edit version of the document as defined above. A goal of comment ranking may be to produce a ranking on C, such that the true comment $c_i$ with respect to the edit $e=\{e_s, e_t\}$ is ranked above all the other comments, sometimes called distractors.

Edit anchoring is the task of finding one or more content portions of a document that are most likely to be the location of an edit, given a specific user comment. The inputs to edit anchoring may include a user comment, c, and a list of candidate post-edit content $S=\{s_1; s_2; \ldots s_n\}$ in the document. In the ground truth, at least one (but possibly more) tokens (sometimes called words) correspond to an edit location for the comment, c. The output may include a list of binary classifications $R=\{r_i\}_{i=1}^n$, where $r_i=1$ indicates that the content $s_i$ is a likely edit location, given comment c.

The system 400 is an NN example of a ML technique for edit-comment relationship determination. Note that other ML techniques for edit-comment determination are possible. For example, a system may use one or more ML techniques, such as classifiers (e.g., Support Vector Machines (SVMs), Logistic Regression, or the like), or structured prediction techniques (e.g., sequence models such as Conditional Random Fields, SVMs with string kernels, or the like).

The system 400 includes a hierarchical four-layer NN model. The layers include an input embedding layer, a contextual embedding layer, a comment-edit attention layer, and an output layer.

The input embedding layer receives pre-edit content 402, one or more comments 404, and post-edit content 406. The input embedding layer maps each word in the user comment 404, c, and the edits 402, 406 $e=\{e_s, e_t\}$ to a high-dimensional vector space (the dimension of the vector space may be lower than the dimension of the words being projected thereto) using a high-dimensional encoding 408A, 408B, 408C. Such projections may be performed using GloVe, Word2Vec or the like to obtain a fixed word embedding with dimension, d, for each input. Out-of-vocabulary inputs may be mapped to an "Unknown" token, which may be initialized with a random value. The output of the high-dimensional encoding 408A, 408B, 408C generates respective matrices $U \in \mathbb{R}^{d \times M}$ representing the pre-edit document, $V \in \mathbb{R}^{d \times M}$ representing the post-edit document, and $Q \in \mathbb{R}^{d \times J}$ representing the comment, wherein M is the length of edits and J is the length of the comments, c.

The contextual embedding layer models the sequential actions between consecutive characters. This may be performed using contextual encoders 412A, 412B, 412B of the high-dimensional encodings from the high-dimensional encoders 408A, 408B, 408C, respectively. The contextual encoders may include bi-directional gate recurrent units (GRUs), long short-term memories (LSTMs), a convolutional neural network (CNN) with attention, an autoencoder, or the like. The contextual encoders 4112A, 412B, 412C may operate over the output of the input embedding layer. The contextual encoders 412A, 412B, 412C may generate respective contextual embedding matrices $U^C \in \mathbb{R}^{2d \times M}$ representing the contextual embedding of the pre-edit document input vectors, $V^C \in \mathbb{R}^{2d \times M}$ representing the contextual embedding of the post-edit document input vectors, and $Q^C \in \mathbb{R}^{2d \times J}$ representing the contextual embedding of the comment input vectors. Note that the row dimension of contextual matrices $U^C$, $V^C$, $Q^C$ may be 2d because of the concatenation of the contextual encoders 412A, 4123, 412C output in both forward and backward directions.

The contextual matrices $U^C$, and $V^C$ of the pre- and post-edit documents, respectively, and the contextual matrix $Q^C$ representing comment may be provided to the contextual embedding layer.

The comment-edit attention layer models the relationship between document edit and comment words. The comment-edit attention layer may maintain and process both the pre- and post-edit documents separately. This may help reduce the information loss that would have occurred if the representations were fused before the comment-edit attention layer. The comment-edit attention layer may use an action encoding 410, $a \in \mathbb{Z}^M$, which indicates the type of edit operation associated with a particular edit (e.g., adding content, deleting content, or leaving content unchanged). An output of the comment-edit attention layer is a comment-aware concatenated vector representation of the edit words in both pre- and post-edit documents, called a relevance vector 428.

The comment-edit attention layer may determine a shared similarity matrix 424A, $S^{pre} \in \mathbb{R}^{M \times J}$, between the comment represented by the contextual comment matrix $Q^c$ and contextual matrix $U^c$ of the pre-edit document, while also accounting for the action encoding 410, a. The elements of this shared similarity matrix 424A may be defined as:

$$S_{i,j}^{pre} = G^{pre}(U_{:,i}^C, Q_{:,i}^C, a_i^{pre})$$

where $G^{pre}$ is a trainable function that determines a similarity between the content-level representations of comments and edits with respect to an edit operation defined by the action encoding 410.

Here $U_{:,i}^C \in \mathbb{R}^{2d \times 1}$ is the vector representation of the i-th content in the pre-edit document and $Q_{:,i}^C \in \mathbb{R}^{2d \times 1}$ is the vector representation of a j-th content in the comment, c. $a_i^{pre} \in \{$first label, second label, third label$\}$ is the action encoding for the edit operation performed on the $i^{th}$ word in the pre-edit document. The function $G^{pre}(u, q, a)$ is a trainable function. A weight vector $w \in \mathbb{R}^{(2d+1) \times 1}$ may be trained. The function, G, may use the trainable weight vector. In some embodiments, $G^{pre}(u, q, a) = w_{pre}^T[u \otimes q; a]$, where $\otimes$ is a product operator determined by multiplier 420A. the multiplier 420A may determine a Hadamard product or other product. In the function, $G^{pre}$, [;] indicates vector concatenation across a row dimension, this is sometimes called combining the vectors. The action encodings 410 may be concatenated to the output of the multiplier 420A, such as by a combine and weight operator 422A. The output of the function, $G^{pre}$, is sometimes called a similarity matrix 424A. The function, $G^{pre}$, is performed by a combination of the multiplier 420A and the combine and weight operator 422A.

The comment-edit attention layer may determine a shared similarity matrix 424B, $S^{post} \in \mathbb{R}^{M \times J}$, between the comment represented by the contextual comment matrix $Q^c$ and contextual matrix $V^c$ of the post-edit document, while also accounting for the action encoding 410, a. The elements of this shared similarity matrix 4241B may be defined as:

$$S_{i,j}^{post} = G^{post}(U_{:,i}^C, Q_{:,i}^C, a_i^{post})$$

where $G^{post}$ is a trainable function that determines a similarity between the content-level representations of comments and edits with respect to an edit operation defined by the action encoding 410.

Here $V_{:,i}^C \in \mathbb{R}^{2d \times 1}$ is the vector representation of the i-th content in the pre-edit document and $Q_{:,i}^C \in \mathbb{R}^{2d \times 1}$ is the vector representation of a j-th content in the comment, c. $a_i^{post} \in \{$first label, second label, third label$\}$ is the action encoding for the edit operation performed on the $i^{th}$ word in the pre-edit document. The function $G^{post}(u, q, a)$ is a trainable function. A weight vector $w \in \mathbb{R}^{(2d+1) \times 1}$ may be trained. The function, $G^{post}$, may use the trainable weight vector. In some embodiments, $G^{post}(u, q, a) = w_{post}^T[u \otimes q; a]$, where $\otimes$ is a product operator determined by multiplier 420B. the multiplier 420B may determine a Hadamard product or other product. In the function, $G^{post}$, [;] indicates vector concatenation across a row dimension, this is sometimes called combining the vectors. The action encodings 410 may be concatenated to the output of the multiplier 420A, such as by a combine and weight operator 422B. The output of the function, $G^{post}$, is sometimes called a similarity matrix 424B. The function, $G^{post}$, is performed by a combination of the multiplier 420B and the combine and weight operator 422B.

Note that the weight vectors, $w_{pre}$ and $w_{post}$ in function $G^{pre}$ and $G^{post}$ may be different for pre-edit document versions and post-edit versions. However, both may be trained simultaneously.

The similarity matrices 424A, 424B may be used by edit-based attention operators 426A, 426B to generate the C2E attention weights, $w_{ce}$. C2E attention weights represent the relevance of words in the edit to those that appear in the comment. These weights help model the relationship between comments and edits. The C2E attention weights $w_c \in \mathbb{R}^M$ for edit words in the pre-edit document may be obtained by taking $w_{ce}^{pre} = \text{softmax}(\max_{col}(S^{pre}))$ where the $\max_{col}(\bullet)$ operator finds the column-wise maximum value from a matrix. Similarly, for the post-edit document, $w_{ce}^{post} = \text{softmax}(\max_{col}(S^{post}))$.

The edit-based attention operators 426A, 426B may determine a relevance vector 428 based on a product between similarity matrices and C2E attention vectors. The C2E attention vectors are comprised of the C2E attention weights. The relevance vector 428 for comment ranking, $h_{rc}$, may be determined as:

$$h_{rc} = [(w_{ce}^{pre})^T S^{pre}; (w_{ce}^{post})^T S^{post}]^T$$

The relevance vector 428 captures the weighted sum of the relevance of the comment with respect to the edits in both the pre-edit content and the post-edit content.

The relevance vector 434 for edit anchoring, $h_{ea}$, may be different than the relevance vector 432 and may not be based on the pre-edit content 402. The relevance vector 434 for edit anchoring may be determined as $$h_{ea} = [0, (w_{ce}^{post})^T S_{post}]^T$$

The preceding zero of $h_{ea}$ can be from the input data of the pre-edit document being empty, making $U_{:,j}^C$ a vector with all zero values. The similarity matrix, S, for the pre-edit version is all zero values as well since the Hadamard product of u and q is zero in this instance.

An output layer may receive the relevance vector 428, 434 and (a) determine a comment ranking loss 430 to be used in training, (b) determine an edit anchoring loss 432 to be used in training, (c) provide the relationship between the edit and the comment based on the relevance vector, or a combination thereof.

The output layer and the loss function of the system 400 may be task specific. Comment ranking includes ranking the relevance of candidate comments given a document edit. A ranked list may be determined based on the relevance score, r. The relevance score, r, may be determined as:

$$r = B^T h$$

where B is a trainable weight vector.

A data sample, i, in comment ranking may include one true edit-comment pair and comment-edit distractors, $n_i$. Assume $r_i^+$ represents the relevance score of the true comment-edit pair and $r_{ij}^-$ as the relevance score of the j-th distractor pair (with $1 \leq j \leq n_i$). A goal of the loss function may be to train the ML technique to make $r_i^+ > r_{ij}^-$ for all j. The loss function may be set to a pairwise hinge loss between true comment-edit pair and distractor relevance scores. Such a loss function may be as follows:

$$L_C(\Theta) = \sum_{i=1}^{N} \sum_{j=1}^{n_i} \max(0, 1 - r_i^+ + r_{ij}^-)$$

where $\Theta$ is the set of all trainable weights in the model and N is the number of training samples in the dataset.

For edit anchoring, a goal may be to predict whether a sentence in a document is likely to be the location of an edit, given a comment. This may be viewed as a binary classification problem. The output layer may determine a probability of predicting a positive class, p, as:

$$p = \text{softmax}(\gamma^T h)$$

where $\gamma$ is a trainable weight vector.

Given the binary nature of the classification problem a cross-entropy loss may be used as the loss function:

$$L_e(\Phi) = -1/N \sum_{i=1}^{N} \sum_{j=1}^{m_i} [y_{ij} \log(p_{ij}) + (1 - y_{ij}) \log(1 - p_{ij})]$$

where $\Phi$ is a set of all trainable weights in the model, N is the number of data samples, $m_i$ is the number of sentences in the i-th data sample, $p_{ij}$ is the predicted label of the j-th portion of content in the i-th data sample of the content, and $y_{ij}$ is a corresponding ground truth label.

Some experiments have concluded that our approach outperforms several baselines by significant margins on both tasks, yielding a best score of 71% precision @1 for comment ranking and 74.4% accuracy for edit anchoring.

Figure 5:
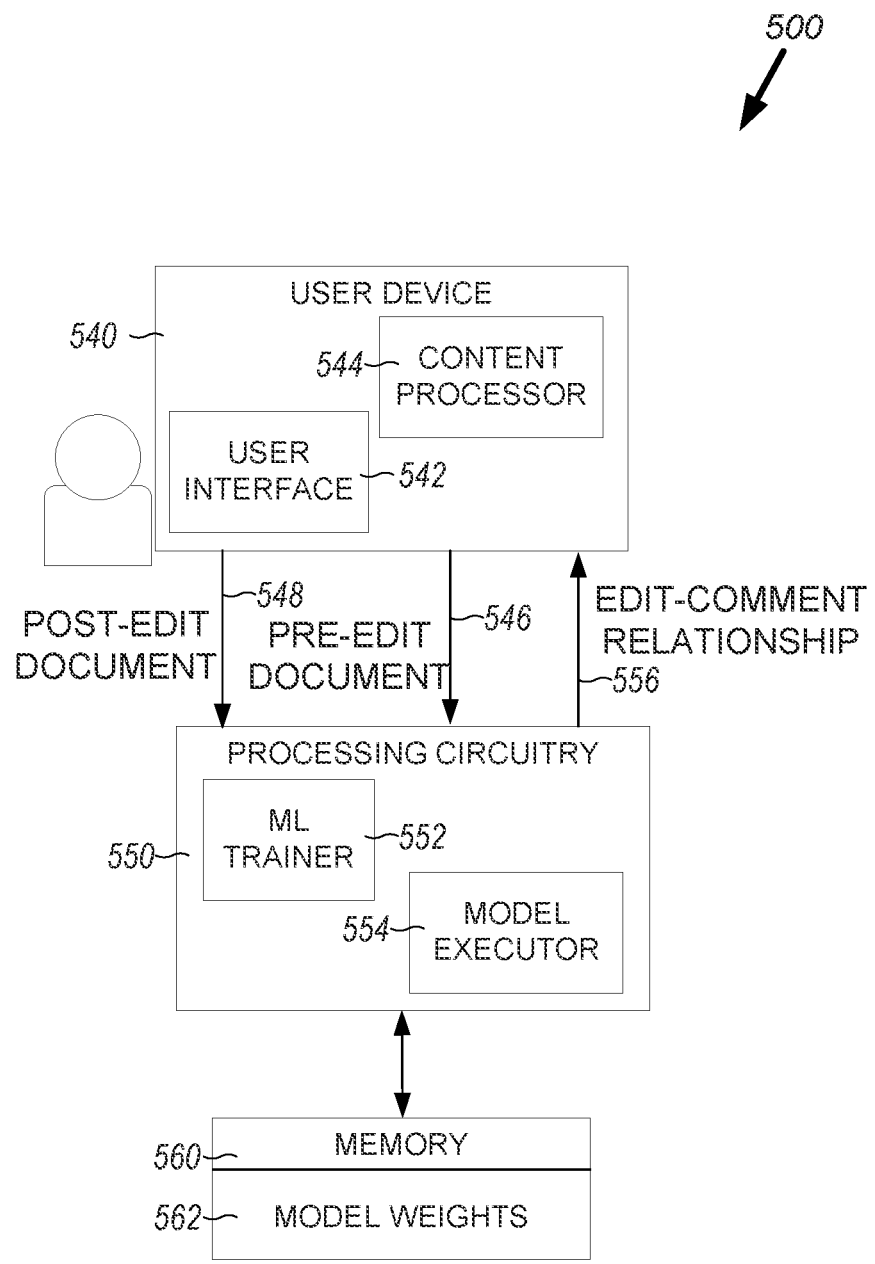
FIG. 5 illustrates, by way of example a diagram of an embodiment of a system for determining a relationship between a comment and an edit of content of a document.

FIG. 5 illustrates, by way of example a diagram of an embodiment of a system 500 for determining a relationship between a comment and an edit of content of a document. The system 5000 as illustrated includes a user device 540, processing circuitry 550, and a memory 560. The user device 540 provides the user with functionality of a content processor 544 through a user interface 542. The user device 540 may include a smartphone, laptop computer, desktop computer, tablet, phablet, e-reader, or the like that is capable of providing the functionality of the content processor 544.

The user interface 542 receives signals from an input device controlled by the user. The user interface 542 interprets the signals and causes the content processor 544 to alter content based on the signals.

The content processor 544 is an application through which the user generates, edits, or reviews content of a document, such as the document 100. Edits made by the user of the content processor 544 may be recorded in a post-edit document. Comments added to a document by the user of the content processor 544 may likewise be recorded in a pre-edit or post-edit document.

A post-edit document 548 and a pre-edit document 546, generated by the content processor 544, may be provided to the processing circuitry 550. The post-edit document 548 is the content produced after a user alters content of the pre-edit document 546. The post-edit document 548 may include a record of the edits made. In embodiments in which the edits are not recorded, the processing circuitry 550 may compare the pre-edit document 548 and the post-edit document 546 to determine the edits made. The comments may part of the post-edit document 548, pre-edit document 546, or a different document or file, such as another document, an electronic mail (email), a message sent using a messaging application, a website, or the like.

The processing circuitry 550 includes hardware, software, or firmware configured to determine a relationship between a comment and an edit. Hardware may include one or more electric or electronic components configured to perform one or more operations of the processing circuitry 550. The electric or electronic components may include one or more transistors, resistors, capacitors, diodes, inductors, analog to digital converters, digital to analog converters, rectifiers, power supplies, logic gates (e.g., AND, OR, XOR, negate, buffer, or the like), switches, oscillators, modulators, demodulators, relays, antennas, phase-looked-loops, amplifiers, central processing units (CPUs), graphics processing units (GPUs), application specific integrated circuits (ASICs), field programmable gate arrays (FPGAs), or the like.

The processing circuitry 550 as illustrated includes an ML trainer 552 and a model executor 554. The ML trainer 552 operates to determine weights 562 of an ML model to be executed by the model executor 554. The IL trainer 552 may operate in a supervised manner, such as by predicting an output for a given input and comparing the predicted output to a known output. A loss function may indicate how to change the weights of the ML model to make a better prediction on future data.

The ML trainer 552 may be configured to perform operations of the system 400. The processing circuitry 550 may be configured to perform the method 300, 200, or a combination thereof.

The processing circuitry 550, while illustrated as being separate from the user device 540, may be a part of the user device 540 in some embodiments. In some other embodiments, the processing circuitry 550 may be part of a different computing device or devices. In some embodiments the processing circuitry 550 is part of the cloud or is provided as a service through the Internet or other network. While the processing circuitry 550 illustrates the ML trainer 552 and the model executor 554 as part of the same device, they may be on different devices. For example, the ML trainer 552 may be implemented in the cloud, while the model executor 554 may be implemented on the user device 540.

The weights 562 may be provided to the memory 560 for future access by the model executor 554. The model executor 554 may retrieve the weights 562 and implement the model using the weights 562. The model may generate an edit-comment relationship 556 based on the comments and edits determined by the processing circuitry 550. The edit-comment relationship 556 may indicate a comment that is most likely associated with an edit or a location of a comment in content of the post-edit document 548.

Figure 6:
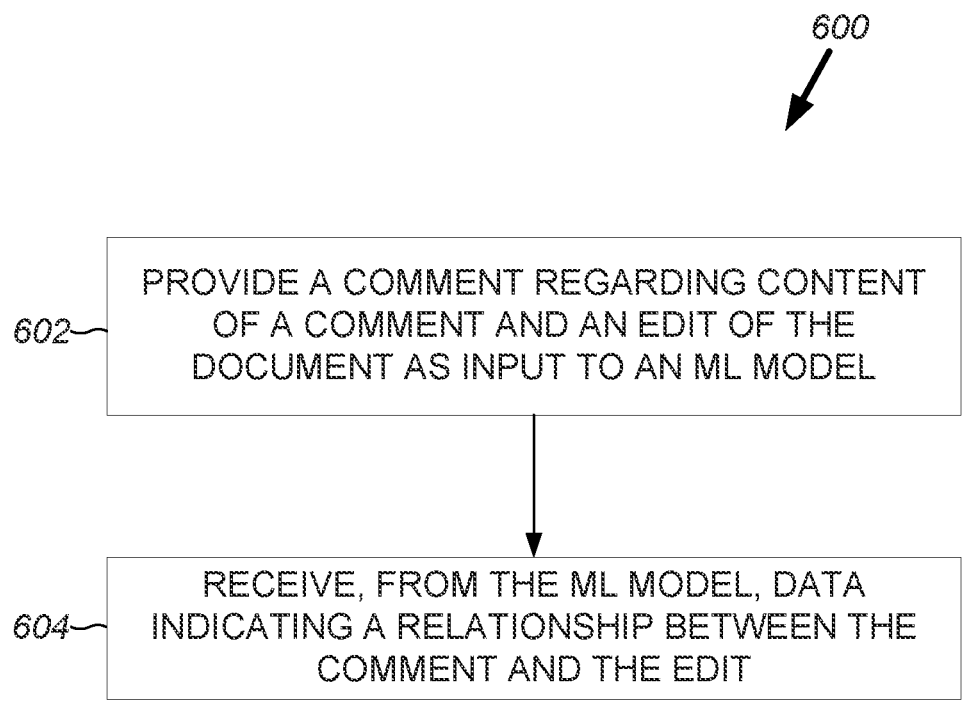
FIG. 6 illustrates, by way of example a diagram of an embodiment of a method for determining a relationship between a comment and an edit.

FIG. 6 illustrates, by way of example a diagram of an embodiment of a method 600 for determining a relationship between a comment and an edit. The method 600 as illustrated includes providing the comment and the edit as input to the ML model, at operation 602; and receiving, from the ML model, data indicating a relationship between the comment and the edit, at operation 604. The relationship can indicate whether the edit addresses the comment or a location of the content that is a target of the comment.

The method 600 can further include, wherein the relationship between the comment and the edit indicates at least one of (a) the comment most-related to the edit or (b) a location of the document that is most likely to be the target of the edit, given the comment. The method 600 can further include, wherein the ML model is configured to determine a relevance score between the edit and the comment and indicate the relationship between the comment and the edit based on the relevance score.

The method 600 can further include determining, based on a pre-edit version of the document and a post-edit version of the document, an action encoding indicating whether the content is the same, removed, or added between content of the pre-edit version and post-edit version of the document by associating content only in the pre-edit version with a first label, associating content only in the post-edit version with a second, different label, and associating content in both the pre-edit version and the post-edit version with a third, different label. The method 600 can further include providing the action encoding with the comment and the edit to the ML model. The method 600 can further include, wherein the ML model determines the relationship between the comment and the edit further based on the action encoding. The method 600 can further include, wherein the ML model is a hierarchical neural network (NN) trained using a supervised learning technique. The method 600 can farther include, wherein the ML model includes an input embed layer that projects the edit and the comment to a vector space, a context embed layer to model sequential interaction between content based on the projected edit and comment, a comment-edit attention layer to model a relationship between the edit and the comment based on the modeled sequential interaction, and an output layer to determine the relationship between the edit and the comment based on the modeled relationship. The method 600 can further include, wherein the context embed layer determines a similarity matrix based on the edit and the comment, wherein the similarity matrix that indicates how similar content of the edit is to content of the comment. The method 600 can further include, wherein the comment-edit attention layer determines a normalized probability distribution of the similarity matrix combined with the action encoding.

The method 600 can further include providing a signal to an application that generated the document, the signal indicating a modification to the document. The method 600 can further include labelling unchanged content between a pre-edit version of the document and a post-edit version of the document with a first label. The method 600 can further include labelling content in the pre-edit version of the document that is different from the content in the post-edit version of the document with a second, different label. The method 600 can further include labelling content in the post-edit version of the document that is different from the content in the pre-edit version of the document with a third, different label. The method 600 can farther include determining, based on the content in the pre-edit version of the document, the content in the post-edit version of the document, the comment, and the first, second, and third labels, and using a machine learning (ML) model, the relationship between the comment and the edit of the document.

Figure 7:
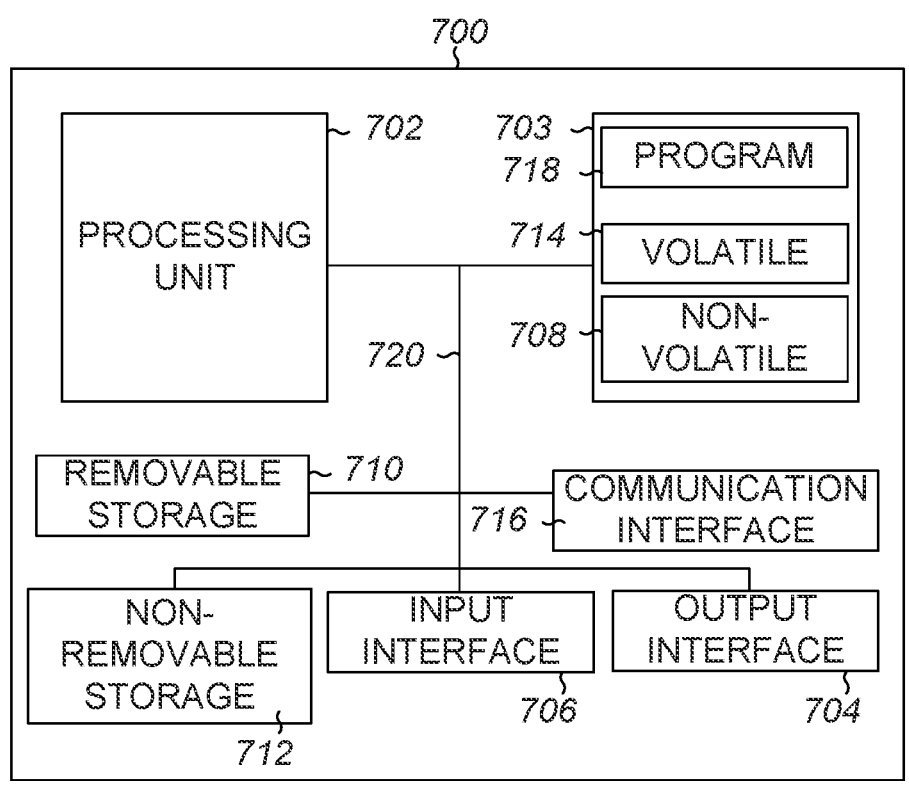
FIG. 7 illustrates, by way of example, a block diagram of an embodiment of a machine (e.g., a computer system) to implement one or more embodiments.

FIG. 7 illustrates, by way of example, a block diagram of an embodiment of a machine 700 (e.g., a computer system) to implement one or more embodiments. The machine 700 may implement an ML technique to determine a relationship between a comment and an edit, such as the methods 200, 300, or the system 400, among others. One example machine 700 (in the form of a computer), may include a processing unit 702, memory 703, removable storage 710, and non-removable storage 712. Although the example computing device is illustrated and described as machine 700, the computing device may be in different forms in different embodiments. For example, the computing device may instead be a smartphone, a tablet, smartwatch, or other computing device including the same or similar elements as illustrated and described regarding FIG. 7. Devices such as smartphones, tablets, and smartwatches are generally collectively referred to as mobile devices. Further, although the various data storage elements are illustrated as part of the machine 700, the storage may also or alternatively include cloud-based storage accessible via a network, such as the Internet.

Memory 703 may include volatile memory 714 and non-volatile memory 708. The machine 700 may include or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 700 may include or have access to a computing environment that includes input 706, output 704, and a communication connection 716. Output 704 may include a display device, such as a touchscreen, that also may serve as an input device. The input 706 may include one or more of a touchscreen, touchpad, mouse, keyboard, camera, one or more device-specific buttons, one or more sensors integrated within or coupled via wired or wireless data connections to the machine 700, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 702 of the machine 700. A hard drive, CD-ROM, and RAM are some examples of articles including a non-transitory computer-readable medium such as a storage device. For example, a computer program 718 may be used to cause processing unit 702 to perform one or more methods or algorithms described herein.

ADDITIONAL NOTES AND EXAMPLES

Example 1 includes a system comprising a memory to store parameters defining a machine learning (ML) model, the ML model to determine a relationship between an edit, by an author or reviewer, of content of a document and a comment, by a same or different author or reviewer, regarding the content of the document, and processing circuitry to provide the comment and the edit as input to the ML model, and receive, from the ML model, data indicating a relationship between the comment and the edit, the relationship including whether the edit addresses the comment or a location of the content that is a target of the comment.

In Example 2, Example 1 further includes, wherein the relationship between the comment and the edit indicates at least one of (a) the comment most-related to the edit or (b) a location of the document that is most likely to be the target of the edit, given the comment.

In Example 3, Example 2 further includes, wherein the ML model is configured to determine a relevance score between the edit and the comment and indicate the relationship between the comment and the edit based on the relevance score.

In Example 4, at least one of Examples 1-3 further includes, wherein the processing circuitry is further to determine, based on a pre-edit version of the document and a post-edit version of the document, an action encoding indicating whether the content is the same, removed, or added between content of the pre-edit version and post-edit version of the document by associating content only in the pre-edit version with a first label, associating content only in the post-edit version with a second, different label, and associating content in both the pre-edit version and the post-edit version with a third, different label, and provide the action encoding with the comment and the edit to the ML model, wherein the ML model determines the relationship between the comment and the edit further based on the action encoding.

In Example 5, Example 4 further includes, wherein the ML model is a hierarchical neural network (NN) trained using a supervised learning technique.

In Example 6, Example 5 further includes, wherein the ML model includes an input embed layer that projects words in the edit and the comment to one or more respective vector spaces, a context embed layer to model sequential interaction between content based on the projected edit and comment, a comment-edit attention layer to model a relationship between the edit and the comment based on the modeled sequential interaction, and an output layer to determine the relationship between the edit and the comment based on the modeled relationship.

In Example 7, Example 6 further includes, wherein the context embed layer determines a similarity matrix based on the edit and the comment, wherein the similarity matrix that indicates how similar content of the edit is to content of the comment.

In Example 8, Example 7 further includes, wherein the comment-edit attention layer determines a normalized probability distribution of the similarity matrix combined with the action encoding.

In Example 9, at least one of the Examples 1-8 further includes, wherein the processing circuitry is further to provide a signal to an application that generated the document, the signal indicating a modification to the document.

Example 10 includes a method of determining a relationship between a document revision and a revision comment of an edited document, the method comprising labelling unchanged content between a pre-edit version of the edited document and a post-edit version of the edited document with a first label, labelling content in the pre-edit version of the edited document that is different from the content in the post-edit version of the edited document with a second, different label, labelling the document revision in the post-edit version of the edited document with a third, different label, the document revision corresponding to content in the post-edit version of the edited document that is different from the content in the pre-edit version of the edited document, and determining, based on the content in the pre-edit version of the edited document, the content in the post-edit version of the edited document, the revision comment, and the first, second, and third labels, and using a machine learning (ML) model, the relationship between the revision comment and the document revision.

In Example 11, Example 10 further includes, wherein the ML model is trained based on at least one of a comment ranking loss function and an edit anchoring loss function.

In Example 12, Example 11 further includes, wherein the ML model is trained based on both the comment ranking loss function and the edit anchoring loss function.

In Example 13, at least one of Examples 10-12 further includes, wherein the ML model is a hierarchical neural network (NN) trained using a supervised learning technique.

In Example 14, Example 13 further includes, wherein the ML model includes an input embed layer that projects the document revision and the revision comment to a vector space, a context embed layer to model sequential interaction between content based on the projected edit and comment, a comment-edit attention layer to model a relationship between the projected and embedded edit and the projected and embedded comment based on the modeled sequential interaction, and an output layer to determine the relationship between the document revision and the comment based on the modeled relationship.

In Example 15, Example 14 further includes, wherein the context embed layer determines a similarity matrix based on the document revision and the revision comment, wherein the similarity matrix that indicates how similar content of the document revision is to content of the revision comment.

Example 16 includes a non-transitory machine-readable medium including instructions that, when executed by a machine, configure the machine to perform operations comprising receiving pre-edit content of a document, post-edit content of the document, and a comment associated with the document, operating a machine learning (ML) model on the pre-edit content, post-edit content, and the comment to determine a relevance score indicating the relationship between content in the post-edit content that is not in the pre-edit content and the comment, and providing data indicating the relationship between the content in the post-edit content that is not in the pre-edit content and the comment.

In Example 17, Example 16 further includes, wherein the operations further comprise labelling unchanged content between the pre-edit version of the document and the post-edit version of the document with a first label, labelling content in the pre-edit version of the document that is different from the content in the post-edit version of the document with a second, different label, labelling content in the post-edit version of the document that is different from the content in the pre-edit version of the document with a third, different label, and wherein operating the ML model includes further operating the ML model on the the first, second, and third labels to determine the relationship between content in the post-edit content that is not in the pre-edit content and the comment of the document.

In Example 18, at least one of Examples 16-17 further includes, wherein the ML model is trained based on at least one of a comment ranking loss function and an edit anchoring loss function.

In Example 19, Example 18 farther includes, wherein the ML model is trained based on both the comment ranking loss function and the edit anchoring loss function.

In Example 20, at least one of Examples 16-19 further includes, wherein the ML model is a hierarchical neural network (NN) trained using a supervised learning technique.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A system comprising:
a memory to store parameters defining a hierarchical neural network (NN) machine learning (ML) model trained using a supervised learning technique, the ML model to determine a relationship between an edit, by an author or reviewer, of content of a body of a pre-edit version of a document that alters the content of the body of the pre-edit version of the document resulting in a post-edit version of the document and a comment in the post-edit version of the document, the comment separate from the body of the post-edit version of the document, by a same or different author or reviewer, regarding the content of the body of the pre-edit version of the document; and
processing circuitry to:
determine, based on the pre-edit version of the document and the post-edit version of the document, an action encoding indicating whether the content is the same, removed, or added between content of the pre-edit version and post-edit version of the document by associating content only in the pre-edit version with a first label of removed, associating content only in the post-edit version with a second, different label of added, and associating content in both the pre-edit version and the post-edit version with a third, different label of same;
provide the comment, the pre-edit version of the document, the action encoding, and the post-edit version of the document as input to the ML model, the post-edit version of the document including the pre-edit version of the document after the edit by the author or reviewer; and
receive, from the ML model and based on the pre-edit version of the document, the action encoding, and the post-edit version, data indicating whether the edit to the content of the body addresses the comment or a location in the body of the content of the body that is a target of the comment.

2. The system of claim 1, wherein the data from the ML model indicates at least one of (a) the comment most-related to the edit or (b) a location of the post-edit version of the document that is the target of the edit, given the comment.

3. The system of claim 2, wherein the ML model is configured to determine a relevance score between the edit and the comment and provide the data based on the relevance score.

4. The system of claim 1, wherein the ML model includes an input embed layer that projects words in the edit and the comment to one or more respective vector spaces, a context embed layer to model sequential interaction between content based on the projected edit and comment, a comment-edit attention layer to model a relationship between the edit and the comment based on the modeled sequential interaction, and an output layer to determine the relationship between the edit and the comment based on the modeled relationship.

5. The system of claim 4, wherein the context embed layer determines a similarity matrix based on the edit and the comment, wherein the similarity matrix includes values indicating how similar content of the edit is to content of the comment.

6. The system of claim 5, wherein the comment-edit attention layer determines a normalized probability distribution of the similarity matrix combined with the action encoding.

7. The system of claim 1, wherein the processing circuitry is further to provide a signal to an application that generated the document, the signal indicating a modification to the document.

8. A method of determining a relationship between an edit of a body of a pre-edit version of a document that alters content of the body of the pre-edit version of the document resulting in a post-edit version of the document and a comment in the document and separate from the body of the document, the method comprising:
  labelling unchanged content between a pre-edit version of the document and a post-edit version of the document with a first label;
  labelling content in the pre-edit version of the document that is different from the content in the post-edit version of the document with a second, different label;
  labelling the content in the post-edit version of the document that is different from the content in the pre-edit version of the document with a third, different label; and
  determining, based on the content in the pre-edit version of the document, the content in the post-edit version of the document, the comment, and the first, second, and third labels, and using a machine learning (ML) model that receives the content in the pre-edit version of the document, the content in the post-edit version of the document, the comment, and the first, second, and third labels, the relationship between the comment and the edit, the ML model trained based on at least one of a comment ranking loss function or an edit anchoring loss function.

9. The method of claim 8, wherein the ML model is trained based on both the comment ranking loss function and the edit anchoring loss function.

10. The method of claim 8, wherein the ML model is a hierarchical neural network (NN) trained using a supervised learning technique.

11. The method of claim 10, wherein the ML model includes an input embed layer that projects the edit and the comment to a vector space, a context embed layer to model sequential interaction between content based on the projected edit and comment, a comment-edit attention layer to model a relationship between the projected and embedded edit and the projected and embedded comment based on the modeled sequential interaction, and an output layer to determine the relationship between the edit and the comment based on the modeled relationship.

12. The method of claim 11, wherein the context embed layer determines a similarity matrix based on the edit and the comment, wherein the similarity matrix includes values indicating how similar content of the edit is to content of the comment.

13. A non-transitory machine-readable medium including instructions that, when executed by a machine, configure the machine to perform operations comprising:
  receiving pre-edit content of a document, post-edit content of the document that includes an edit to a body of the pre-edit content of the document resulting in the post-edit content of the document, and a comment of the document separate from the body of the document;
  operating a machine learning (ML) model on the pre-edit content, post-edit content, and the comment to determine a relevance score indicating the relevance of content in the post-edit content that is not in the pre-edit content and the comment, the ML model trained based on at least one of a comment ranking loss function or an edit anchoring loss function; and
  providing data indicating a relationship between the content in the post-edit content that is not in the pre-edit content and the comment.

14. The non-transitory machine-readable medium of claim 13, wherein the operations further comprise:
  labelling unchanged content between the pre-edit content of the document and the post-edit content of the document with a first label;
  labelling content in the pre-edit content of the document that is different from the content in the post-edit content of the document with a second, different label;
  labelling content in the post-edit content of the document that is different from the content in the pre-edit content of the document with a third, different label; and
  wherein operating the ML model includes further operating the ML model on the first, second, and third labels to determine the relationship between content in the post-edit content that is not in the pre-edit content and the comment of the document.

15. The non-transitory machine-readable medium of claim 13, wherein the ML model is trained based on both the comment ranking loss function and the edit anchoring loss function.

16. The non-transitory machine-readable medium of claim 13, wherein the ML model is a hierarchical neural network (NN) trained using a supervised learning technique.

* * * * *